United States Patent
Borhan et al.

(10) Patent No.: US 10,576,978 B2
(45) Date of Patent: Mar. 3, 2020

(54) SYSTEM AND METHOD FOR PREDICTIVE ENGINE AND AFTERTREATMENT SYSTEM CONTROL

(71) Applicant: Cummins, Inc., Columbus, IN (US)

(72) Inventors: Hoseinali Borhan, Bloomington, IN (US); Akash S. Desai, Columbus, IN (US); Edmund P. Hodzen, Columbus, IN (US); Pinak Jayant Tulpule, Columbus, IN (US); Bibin N. Pattel, Columbus, IN (US)

(73) Assignee: Cummins, Inc., Columbus, IN (US)

( * ) Notice: Subject to any disclaimer, the term of this patent is extended or adjusted under 35 U.S.C. 154(b) by 121 days.

(21) Appl. No.: 15/833,775

(22) Filed: Dec. 6, 2017

(65) Prior Publication Data

US 2019/0168753 A1    Jun. 6, 2019

(51) Int. Cl.
*B60W 30/14*  (2006.01)
*B60W 40/076*  (2012.01)
*F01N 3/20*  (2006.01)
*F02D 41/02*  (2006.01)

(52) U.S. Cl.
CPC ........ *B60W 30/143* (2013.01); *B60W 40/076* (2013.01); *F01N 3/208* (2013.01); *F02D 41/0235* (2013.01); *B60W 2510/285* (2013.01); *B60W 2550/142* (2013.01); *B60W 2560/02* (2013.01); *F02D 2200/0414* (2013.01); *F02D 2200/0625* (2013.01); *F02D 2200/08* (2013.01)

(58) Field of Classification Search
CPC ............. B60W 30/143; B60W 40/076; B60W 2550/142; B60W 2510/285; B60W 2560/02; F01N 3/208; F02D 41/0235; F02D 2200/0625; F02D 2200/080414
See application file for complete search history.

(56) References Cited

U.S. PATENT DOCUMENTS

| | | | |
|---|---|---|---|
| 7,051,514 B2 * | 5/2006 | Midlam-Mohler | B60K 6/48 60/278 |
| 7,861,518 B2 | 1/2011 | Federie | |
| 8,392,091 B2 | 3/2013 | Hebbale et al. | |
| 8,452,509 B2 | 5/2013 | Sujan et al. | |
| 8,505,278 B2 | 8/2013 | Farrell et al. | |

(Continued)

FOREIGN PATENT DOCUMENTS

| | | | |
|---|---|---|---|
| JP | 2009-191643 | * | 8/2009 |
| WO | WO-2010/126521 | | 11/2010 |
| WO | WO-2014/149043 | | 9/2014 |

*Primary Examiner* — Michael J Zanelli
(74) *Attorney, Agent, or Firm* — Foley & Lardner LLP

(57) ABSTRACT

Systems and apparatuses include a controller structured to: receive information indicative of an operating condition of a vehicle subsystem, receive information indicative of an external static condition, and receive information indicative of an external dynamic condition. The system is further configured to predict a fuel cut event based on at least one of the operating condition of the vehicle subsystem, the external static condition, and the external dynamic condition. Responsive to predicting a fuel cut event, the controller is structured to modulate at least one of a torque or a speed of the engine based on the operating condition of the vehicle subsystem and at least one of the information indicative of the external static condition and the external dynamic condition.

17 Claims, 8 Drawing Sheets

(56) References Cited

U.S. PATENT DOCUMENTS

| | | |
|---|---|---|
| 8,532,907 B2 | 9/2013 | Taguchi |
| 8,849,550 B2 * | 9/2014 | Larsson .............. F02D 41/0055 |
| | | 701/112 |
| 8,930,115 B2 | 1/2015 | Filev et al. |
| 8,984,960 B2 * | 3/2015 | Fujii .................... G01F 15/185 |
| | | 73/861.27 |
| 9,020,726 B2 * | 4/2015 | Boeckenhoff ......... B60W 10/06 |
| | | 701/70 |
| 9,162,679 B2 | 10/2015 | Sujan et al. |
| 9,482,169 B2 | 11/2016 | Hodzen et al. |
| 9,650,934 B2 | 5/2017 | Pachner et al. |
| 2013/0111905 A1 | 5/2013 | Pekar et al. |
| 2015/0233314 A1 | 8/2015 | Stenlaas et al. |
| 2016/0280224 A1 * | 9/2016 | Tatourian ............. B60W 30/143 |
| 2016/0332632 A1 | 11/2016 | Roos et al. |

* cited by examiner

US 10,576,978 B2

SYSTEM AND METHOD FOR PREDICTIVE ENGINE AND AFTERTREATMENT SYSTEM CONTROL

TECHNICAL FIELD

The present disclosure relates to controlling vehicle dynamics based on predictive information about a vehicle route and internal operating conditions of the vehicle. More particularly, the present disclosure relates to systems and methods for controlling vehicle dynamics to reduce transient engine operating conditions based on predictive information about the vehicle route and internal operating conditions of the vehicle.

BACKGROUND

Vehicles operate under variable conditions due to changing operating conditions, such as weather, road grade, speed limit, and traffic. However, under operating conditions such as changes in road grade (e.g. uphill and/or downhill road conditions) or slow/heavy traffic, an engine experiences transient engine operating conditions, which can lead to reduced fuel efficiency of the vehicle.

SUMMARY

One embodiment relates to a system. The system includes a controller structured to receive information indicative of an operating condition of a vehicle subsystem, receive information indicative of an external static condition, and receive information indicative of an external dynamic condition. The controller is further structured to determine a trajectory of the vehicle based on the external static condition and the external dynamic condition. The controller is further structured to determine operating set points of the vehicle subsystem based on the vehicle trajectory and/or the operating condition of the vehicle subsystem.

One embodiment relates to a system. The system includes a controller structured to receive information indicative of an operating condition of a vehicle subsystem, receive information indicative of an external static condition, and receive information indicative of an external dynamic condition. The controller is further structured to predict a fuel cut event based on at least one of the operating condition of the vehicle subsystem, the external static condition, and the external dynamic condition. Responsive to predicting a fuel cut event, the controller is structured to modulate at least one of a torque or a speed of the engine based on the operating condition of the vehicle subsystem and at least one of the external static condition and the external dynamic condition.

Another embodiment relates to an apparatus. The apparatus includes an internal information circuit, an external dynamic information circuit, an external static information circuit, and a drive assist circuit. The internal information circuit is structured to receive information indicative of an operating condition of a subsystem of a vehicle. The external dynamic information circuit is structured to receive information indicative of an external dynamic condition of the vehicle. The external static information circuit is structured to receive information indicative of an external static condition of the vehicle. The drive assist circuit is structured to predict a fuel cut event based on at least one of the operating condition of the vehicle subsystem, the external static condition, and the external dynamic condition. The drive assist circuit is further structured to modulate at least one of a torque or a speed of an engine of the vehicle in response to the operating condition of the vehicle subsystem and at least one of the external static condition and the external dynamic condition.

Another embodiment relates to a method. The method includes receiving information indicative of an operating condition of a subsystem of a vehicle, receiving information indicative of an external static condition of a route of the vehicle, the external static condition including grade data for the route of the vehicle, and receiving information indicative of an external dynamic condition of the route of the vehicle, the external dynamic condition including information for a route that changes as a function of time. The method further includes predicting a fuel cut event based on at least one of the operating conditions of the vehicle subsystem, the external static condition, and the external dynamic condition. The method further includes modulating at least one of a torque or a speed of an engine of the vehicle in response to the operating condition of the vehicle subsystem and at least one of the external static condition and the external dynamic condition.

These and other features, together with the organization and manner of operation thereof, will become apparent from the following detailed description when taken in conjunction with the accompanying drawings.

DETAILED DESCRIPTION

Figure 1:
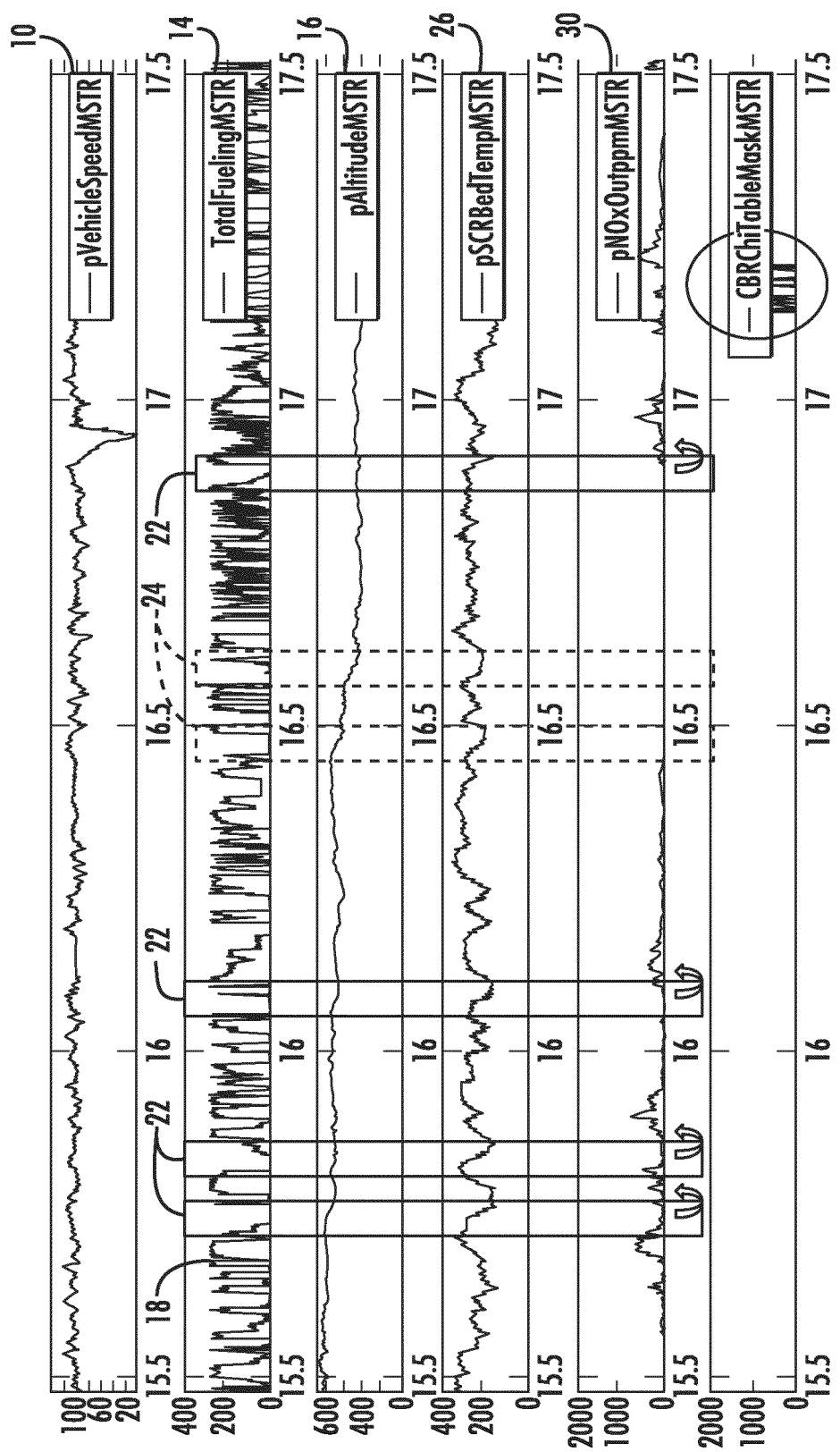
FIG. 1 is an illustrative diagram of a duty cycle for a vehicle, such as a truck, traveling along a highway, according to an example embodiment.

Following below are more detailed descriptions of various concepts related to, and embodiments of methods, apparatuses, and systems for dynamically controlling a torque output and/or a speed of an engine of a vehicle operating in a driver assist mode based on operating conditions of a vehicle subsystem, external dynamic conditions, and/or external static conditions. The various concepts introduced herein below may be implemented in any number of ways, as the concepts described are not limited to any particular manner of embodiment. Examples of specific embodiments and applications are provided primarily for illustrative purposes.

Referring to the Figures generally, the various embodiments disclosed herein relate to systems, apparatuses, and methods for controlling the dynamics of an engine of a vehicle operating in a driver assist mode based on one or more operating conditions of the vehicle subsystem, external dynamic conditions (e.g., information for a route that changes as a function of time), and/or external static conditions (e.g., route grade data). Conventional vehicles having driver assist modes may utilize static information about future road grade conditions to control the vehicle speed to optimize fuel efficiency. However, conventional vehicles do not consider the operating conditions of the vehicle subsystems (e.g. engine speed and/or torque, temperature of the aftertreatment system) when controlling vehicles in the driver assist modes. Additionally, under conditions such as downhill road conditions or slow/heavy traffic, an engine of the vehicle can experience fuel cut events, which can lead to cooling of an exhaust aftertreatment system of the vehicle, reduced fuel efficiency of the exhaust aftertreatment system and increased exhaust concentrations of nitrogen oxide (NOx) and ammonia.

According to the present disclosure, a controller is communicably coupled with one or more external data providing sources over a network (e.g., a telematics system provider, another vehicle via a Vehicle-to-Vehicle network, a Vehicle-to-X network, etc.), such that the controller may receive data and have a knowledge of one or more future conditions for the vehicle. Based on the operating conditions of a vehicle subsystem, the external dynamic conditions, and/or the external static conditions, the controller identifies future conditions indicative of a fuel cut event and predicts a duration of the fuel cut event.

The controller may also be communicably coupled with one or more vehicle subsystems (e.g., the exhaust aftertreatment subsystem) and may receive data indicative of conditions of the one or more vehicle subsystems (e.g., temperature of exhaust gas flowing through a part of the exhaust aftertreatment system). The controller may predict the condition of the one or more vehicle subsystems during the fuel cut event based on the condition of the one or more vehicle subsystems and the predicted duration of the fuel cut event. In response to predicting that the condition of the one or more vehicle subsystems may change to a suboptimal condition during the fuel cut event, the controller may change a speed or a torque output of the engine before the fuel cut event to prevent the condition of the one or more vehicle subsystems from changing to the suboptimal condition during the fuel cut event.

For example, the controller may receive data indicating that the vehicle is traveling on a downhill portion of a route and in response may predict a fuel cut event and a fuel cut duration for the downhill portion of the route. The controller may receive data indicating a temperature of exhaust gas in the exhaust aftertreatment system of the vehicle and/or at temperature of the exhaust aftertreatment system, and in response predict that the temperature of the gas in the exhaust aftertreatment may drop below the low temperature threshold of the exhaust aftertreatment system during the duration of the fuel cut event. In response to predicting the temperature drop in the exhaust gas in the exhaust aftertreatment system during the fuel cut event, the controller may command the engine to increase the speed or the torque output to generate additional heat before the predicted fuel cut event occurs.

In another embodiment, the controller is communicably coupled with one or more external data providing sources (e.g., a telematics system provider, another vehicle via a Vehicle-to-Vehicle network, a Vehicle-to-X network, etc.), such that the controller may receive data and have a knowledge of one or more future conditions for the vehicle. For example, the controller may determine a trajectory (e.g. a route) of the vehicle based on the external static conditions and the external dynamic conditions of the route. The controller may determine a series of set points (e.g. engine speed set points, engine output torque set points, engine fueling set points) of the vehicle subsystems for the trajectory. The controller may determine and/or update the series of set points of the vehicle subsystems for the trajectory based on information indicative of the operating conditions of the vehicle subsystem, the external dynamic conditions, and/or the external static conditions. For example, the controller may identify future conditions indicative of a braking event and predict a reduced engine speed for preventing the braking event. The controller may then update the series of set points of the vehicle subsystem to compensate for the upcoming reduced speed conditions without requiring actuation of the service brakes. In another example, the controller may determine that a temperature of the exhaust aftertreatment system (e.g. the SCR catalyst bed) is near/below a low temperature threshold. The controller is structured to determine whether the trajectory indicates upcoming road conditions indicative of an increase in temperature of the engine.

In a further example, the controller may receive data indicating a future turn or future traffic conditions (e.g., traffic lights, stop sign, etc.) for which a speed reduction is needed. In response to receiving the data indicative of a future speed reduction, the controller may reduce the speed of the engine before the turn or upcoming traffic conditions to prevent service braking. Alternatively, in response to receiving data indicative of future traffic conditions for which a speed reduction is required, the controller may command the vehicle to change to another lane of traffic to prevent service braking.

As used herein, the term "driver assist mode" means that the controller of the vehicle helps the operator drive the vehicle. The "driver assist mode" may therefore include a cruise control operating mode, a semi-autonomous driving mode, and a fully autonomous driving mode. For example, in the cruise control operating mode, the controller may control a speed of an engine according to a predetermined speed input by an operator to maintain or substantially maintain a desired vehicle speed, and the operator may steer and brake the vehicle. In other embodiments, the driver assist mode may be a semi-autonomous mode in which the controller determines the speed and/or the torque output of the engine based on the operating conditions of a vehicle subsystem, the external dynamic conditions (e.g., information for a route that changes as a function of time), and/or the external static conditions (e.g., route grade data). In such an embodiment, the operator may have control over a steering system of the vehicle. In other embodiments, the driver assist mode may be a fully autonomous mode in which the controller determines the speed and/or the torque output of the engine and steers the vehicle based on the operating conditions of the vehicle subsystem, the external dynamic conditions, and/or the external static conditions.

As also used herein, the term "fuel cut event" describes a condition in which fuel is not injected into the engine of the vehicle. The variability in fueling is caused by the external static conditions (e.g. changes in road grade and/or road curvature), and/or the external dynamic conditions (e.g. slow traffic and/or weather conditions), and/or operation of the vehicle by an operator (e.g., he/she takes her foot off of the accelerator pedal).

As also used herein, the term "modulate" means that the controller changes (e.g. increases or decreases) an output (e.g. speed and/or torque) in response to the external dynamic conditions, the external static conditions, and/or the operating condition of the vehicle subsystem.

Referring now to FIG. 1, an engine duty cycle of a vehicle, such as a class 8 truck, is depicted as the truck drives along a highway in a driver assist mode. A series of plots are depicted in FIG. 1, which include plot 10, which indicates a speed of the vehicle, plot 14, which indicates fueling of an engine of the vehicle, plot 16, which indicates a road grade of a route of the vehicle, plot 26, which indicates a temperature of the exhaust aftertreatment system of the vehicle, and a plot 30, which indicates an amount of nitrogen oxides (NOx) in the exhaust leaving the exhaust aftertreatment system of the vehicle. As shown in plot 10, the speed of the engine of the vehicle is substantially constant while driving under highway conditions. In contrast, as shown in plot 14, the fueling of the engine (e.g. fuel injection into the engine cylinders) is highly transient and varies between maximum fueling (see, for example, point 18) and zero fueling, or fuel cut events 22, 24. Plot 16 illustrates the road grade information (e.g. external static conditions). As can be seen by comparing plot 16 and plot 26, the fuel cut events 22, 24 correspond to downhill portions of the road grade. With continued reference to FIG. 1, plot 30 shows the temperature of the exhaust aftertreatment unit of the vehicle. For example, in one embodiment, the temperature of the exhaust aftertreatment system refers to a temperature of a component in the system (e.g., the SCR, the DOC, etc.). In another embodiment, the temperature of the exhaust aftertreatment system refers to a temperature of exhaust gas in the exhaust aftertreatment system (e.g., at one or more locations where the temperature sensors are positioned in FIG. 2). Comparison of plot 14 and plot 26 indicates that the temperature of the exhaust aftertreatment unit decreases during the fuel cut events 22, 24. Operation of selective catalytic reduction (SCR) catalysts of the exhaust aftertreatment unit is temperature sensitive and an efficiency of the SCR catalyst decreases when a temperature of the exhaust aftertreatment unit falls below a low temperature threshold. For example, the SCR catalyst illustrated in FIG. 1 operates efficiently at temperatures above the low temperature threshold of approximately 200 degrees Celsius. As indicated in plot 26, a temperature of the exhaust aftertreatment system falls below the low temperature threshold during the fuel cut events 22. During the fuel cut events 22, the efficiency of the SCR process decreases, leading to higher amounts of nitrogen oxides (NOx) and ammonia in the exhaust stream of the vehicle. For example, plot 30 of FIG. 1 is a plot of a NOx concentration in the exhaust stream of the vehicle. As indicated by comparison of plots 26 and 30, the concentration of NOx in the exhaust stream spikes for the fuel cut events 22. The temperature of the exhaust aftertreatment system remains above the low temperature threshold during the fuel cut events 24. Accordingly, the concentration of NOx in the exhaust stream does not spike during the fuel cut events 24. Therefore, controlling the engine of the vehicle to maintain the temperature of the exhaust aftertreatment system above the lower temperature threshold during a fuel cut event is advantageous for reducing vehicle emissions.

Figure 2:
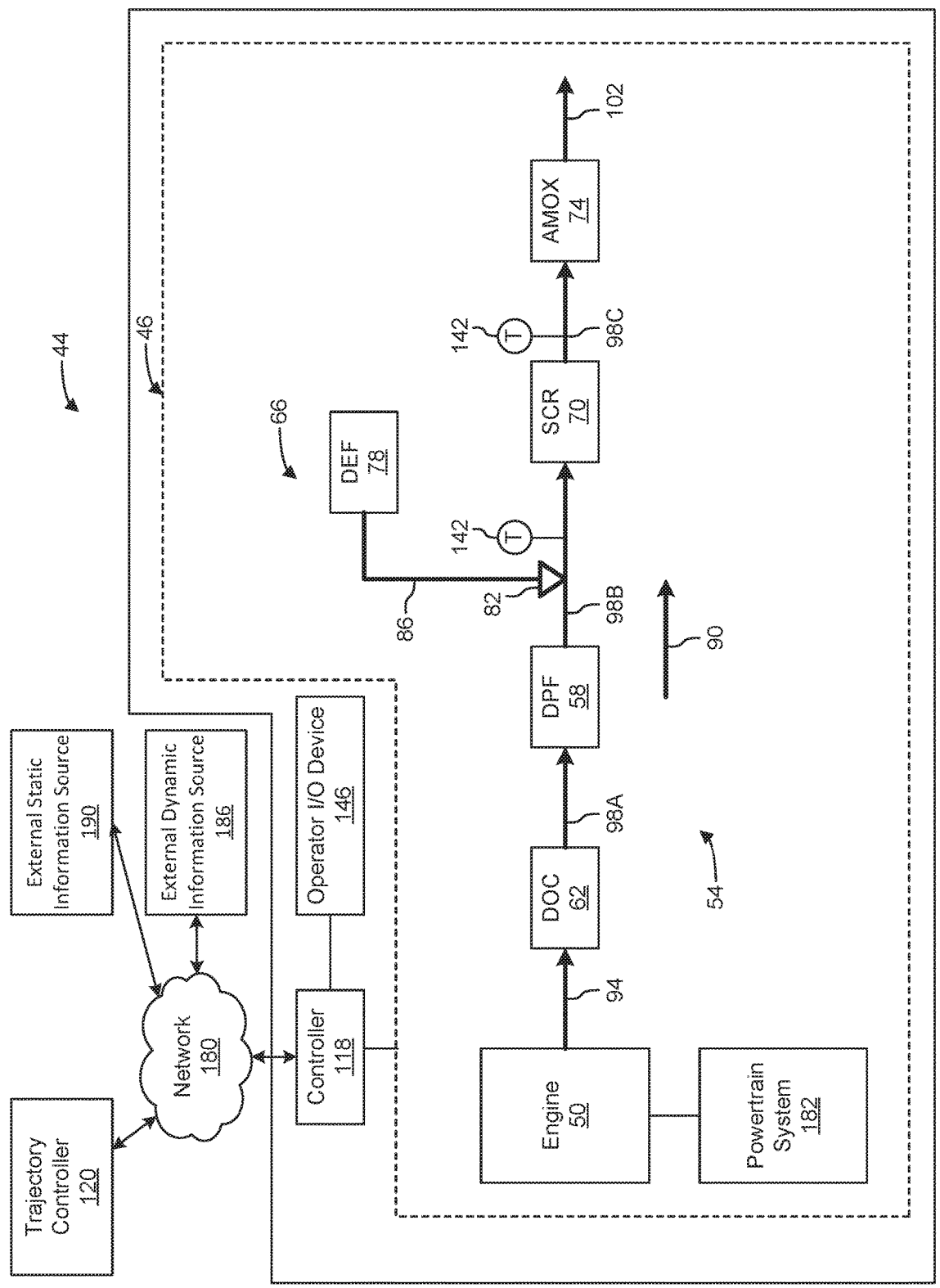
FIG. 2 is a schematic diagram of a vehicle including an exhaust aftertreatment system with a controller, according to an example embodiment.

As shown in FIG. 2, a vehicle 44 including an engine system 46 including an engine 50 coupled to an exhaust aftertreatment system 54, a controller 118 and an operator input/output (I/O) device 146 is depicted, according to an example embodiment. The controller 118 is in electronic communication with a trajectory controller 120. The vehicle 44 includes an engine system 46 that includes an internal combustion engine 50 and an exhaust aftertreatment system 54 in exhaust gas-receiving communication with the engine 50. According to one embodiment and as shown, the engine 50 is structured as a compression-ignition internal combustion ("IC") engine that utilizes diesel fuel. Within the internal combustion engine 50, air from the atmosphere is combined with fuel, and combusted, to power the engine 50. Combustion of the fuel and air in the compression chambers of the engine 50 produces exhaust gas that is operatively vented to an exhaust manifold (not shown) and to the exhaust aftertreatment system 54.

However, in various alternate embodiments, the engine 50 may be another type of IC engine, such as a gasoline engine, a natural gas engine, a dual fuel engine, an ethanol engine, and/or a biodiesel engine, or a fuel cell. In still other embodiments, the vehicle be a hybrid vehicle or an electric vehicle. In such embodiments, the engine 50 may comprise a motor (e.g., a DC motor) and the vehicle 44 may include batteries to power the vehicle 44. The vehicle 44 may be an on-road or an off-road vehicle including, but not limited to, line-haul trucks, mid-range trucks (e.g., pick-up truck), cars (e.g., sedans, hatchbacks, coupes, etc.), buses, vans, refuse vehicles, delivery trucks, and any other type of vehicle. Thus, the present disclosure is applicable with a wide variety of embodiments.

Returning to FIG. 2, the exhaust aftertreatment system 54 includes a diesel particulate filter (DPF) 58, a diesel oxidation catalyst (DOC) 62, a selective catalytic reduction (SCR) system 66 with an SCR catalyst 70, and an ammonia oxidation (AMOx) catalyst 74. The SCR system 66 further includes a reductant delivery system that has a diesel exhaust fluid (DEF) source 78 that supplies DEF to a DEF doser 82 via a DEF line 86.

In an exhaust flow direction, as indicated by directional arrow 90, exhaust gas flows from the engine 50 into inlet piping 94 of the exhaust aftertreatment system 54. From the inlet piping 94 the exhaust gas flows into the DOC 62 and exits the DOC 62 into a first section of exhaust piping 98A. From the first section of exhaust piping 98A, the exhaust gas flows into the DPF 58 and exits the DPF 58 into a second section of exhaust piping 98B. From the second section of exhaust piping 98B, the exhaust gas flows into the SCR catalyst 70 and exits the SCR catalyst 70 into the third section of exhaust piping 98C. As the exhaust gas flows through the second section of exhaust piping 98B, it is periodically dosed with DEF by the DEF doser 82. Accordingly, the second section of exhaust piping 98B acts as a decomposition chamber or tube to facilitate the decomposition of the DEF to ammonia. From the third section of exhaust piping 98C, the exhaust gas flows into the AMOx catalyst 74 and exits the AMOx catalyst 74 into the outlet piping 102 before the exhaust gas is expelled from the exhaust aftertreatment system 54. Based on the foregoing, in the illustrated embodiment, the DOC 62 is positioned upstream of the DPF 58 and the SCR catalyst 70, and the SCR catalyst 70 is positioned downstream of the DPF 58 and upstream of the AMOx catalyst 74. However, in alternative embodiments, other arrangements of the components of the exhaust aftertreatment system 54 are also possible (e.g., the AMOx catalyst 74 may be excluded from the exhaust aftertreatment system 54).

The DOC 62 may have any of various flow-through designs. Generally, the DOC 62 is structured to oxidize at least some particulate matter, e.g., the soluble organic fraction of soot, in the exhaust and reduce unburned hydrocarbons and CO in the exhaust to less environmentally harmful compounds. For example, the DOC 62 may be structured to reduce the hydrocarbon and CO concentrations in the exhaust to meet the requisite emissions standards for those components of the exhaust gas. An indirect consequence of the oxidation capabilities of the DOC 62 is the ability of the DOC 62 to oxidize NO into $NO_2$. In this manner, the level of $NO_2$ exiting the DOC 62 is equal to the $NO_2$ in the exhaust gas generated by the engine 50 plus the $NO_2$ converted from NO by the DOC 62.

In addition to treating the hydrocarbon and CO concentrations in the exhaust gas, the DOC 62 may also be used in the controlled regeneration of the DPF 58, the SCR catalyst 70, and the AMOx catalyst 74. This can be accomplished through the injection, or dosing, of unburned HC into the exhaust gas upstream of the DOC 62. Upon contact with the DOC 62, the unburned HC undergoes an exothermic oxidation reaction which leads to an increase in the temperature of the exhaust gas exiting the DOC 62 and subsequently entering the DPF 58, the SCR catalyst 70, and/or the AMOx catalyst 74. The amount of unburned HC added to the exhaust gas is selected to achieve the desired temperature increase or target controlled regeneration temperature.

The DPF 58 may be any of various flow-through designs, and is structured to reduce particulate matter concentrations, e.g., soot and ash, in the exhaust gas to meet one or more requisite emission standards. The DPF 58 captures particulate matter and other constituents, and thus needs to be periodically regenerated to burn off the captured constituents. Additionally, the DPF 58 may be configured to oxidize NO to form $NO_2$ independent of the DOC 62.

As discussed above and in this example configuration, the SCR system 66 includes a reductant delivery system with a reductant (e.g., DEF) source, pump (not shown) and delivery mechanism or doser 82. The reductant source can be a container or tank capable of retaining a reductant, such as, for example, ammonia ($NH_3$), DEF (e.g., urea), or diesel oil. The reductant source is in reductant supplying communication with the pump, which is configured to pump reductant from the reductant source to the delivery mechanism 82 via a reductant delivery line. The delivery mechanism 82 is positioned upstream of the SCR catalyst 70. The delivery mechanism 82 is selectively controllable (e.g., by the controller 118) to inject reductant directly into the exhaust gas stream prior to entering the SCR catalyst 70. As described herein, the controller 118 is structured to control the timing and amount of the reductant delivered to the exhaust gas. In some embodiments, the reductant may either be ammonia or DEF, which decomposes to produce ammonia. As briefly described above, the ammonia reacts with NOx in the presence of the SCR catalyst 70 to reduce the NOx to less harmful emissions, such as $N_2$ and $H_2O$. The NOx in the exhaust gas stream includes $NO_2$ and NO. Generally, both $NO_2$ and NO are reduced to $N_2$ and $H_2O$ through various chemical reactions driven by the catalytic elements of the SCR catalyst 70 in the presence of $NH_3$.

The SCR catalyst 70 may be any of various catalysts known in the art. For example, in some embodiments, the SCR catalyst 70 is a vanadium-based catalyst, and in other embodiments, the SCR catalyst is a zeolite-based catalyst, such as a Cu-Zeolite or a Fe-Zeolite catalyst. In one representative embodiment, the reductant is aqueous urea and the SCR catalyst 70 is a zeolite-based catalyst.

In some embodiments, an efficiency of the SCR catalyst 70 is temperature dependent, meaning that the SCR catalyst is more efficient at reducing the NOx into less-harmful emissions at higher temperatures. For example, the SCR catalyst 70 may not efficiently convert the NOx in the exhaust gas into less harmful emissions at temperatures below a low temperature threshold of the SCR catalyst 70. In some embodiments, such as the embodiments shown in FIG. 1, the SCR catalyst 70 has a lower temperature of substantially 200 degrees Celsius. Embodiments using other types of SCR catalysts may have different low temperature thresholds.

The AMOx catalyst 74 may be any of various flow-through catalysts configured to react with ammonia to produce mainly nitrogen. As briefly described above, the AMOx catalyst 74 is structured to remove ammonia that has slipped through or exited the SCR catalyst 70 without reacting with NOx in the exhaust. In certain instances, the exhaust aftertreatment system 54 can be operable with or without an AMOx catalyst. Further, although the AMOx catalyst 74 is shown as a separate unit from the SCR catalyst 70 in FIG. 2, in some embodiments, the AMOx catalyst 74 may be integrated with the SCR catalyst 70, e.g., the AMOx catalyst 74 and the SCR catalyst 70 can be located within the same housing. According to the present disclosure, the SCR catalyst 70 and AMOx catalyst 74 are positioned serially, with the SCR catalyst 70 preceding the AMOx catalyst 74.

Various sensors, such as NOx sensors and temperature sensors 142 may be strategically disposed throughout the exhaust aftertreatment system 54 and may be in communication with the controller 118 to monitor operating conditions of the engine system 46. In this regard, the controller 118 may receive data from the one or more sensors. The temperature sensors 142 are associated with the SCR catalyst 70 and thus can be defined as SCR temperature sensors 142. The SCR temperature sensors 142 are strategically positioned to detect the temperature of exhaust gas flowing into and out of the SCR catalyst 70.

Although the exhaust aftertreatment system 54 shown includes one of an DOC 62, DPF 58, SCR catalyst 70, and AMOx catalyst 74 positioned in specific locations relative to each other along the exhaust flow path, in other embodiments, the exhaust aftertreatment system 54 may include more than one of any of the various catalysts positioned in any of various positions relative to each other along the exhaust flow path as desired. Further, although the DOC 62 and AMOx catalyst 74 are non-selective catalysts, in some embodiments, the DOC 62 and AMOx catalyst 74 can be selective catalysts.

FIG. 2 is also shown to include an operator input/output (I/O) device 146. The operator I/O device 146 is communicably coupled to the controller 118, such that information may be exchanged between the controller 118 and the operator I/O device 146, wherein the information may relate to one or more components of FIG. 2 or determinations/commands/instructions/etc. (described below) of the controller 118. The operator I/O device 146 enables an operator of the vehicle (or another passenger) to communicate with the controller 118 and one more components of the vehicle and components of FIG. 2. For example, the operator I/O device 146 may include, but is not limited to, an interactive display, a touchscreen device, one or more buttons and switches, voice command receivers, etc. Via the operator I/O device 146, the controller 118 may provide various information concerning the operations described herein.

Figure 3:
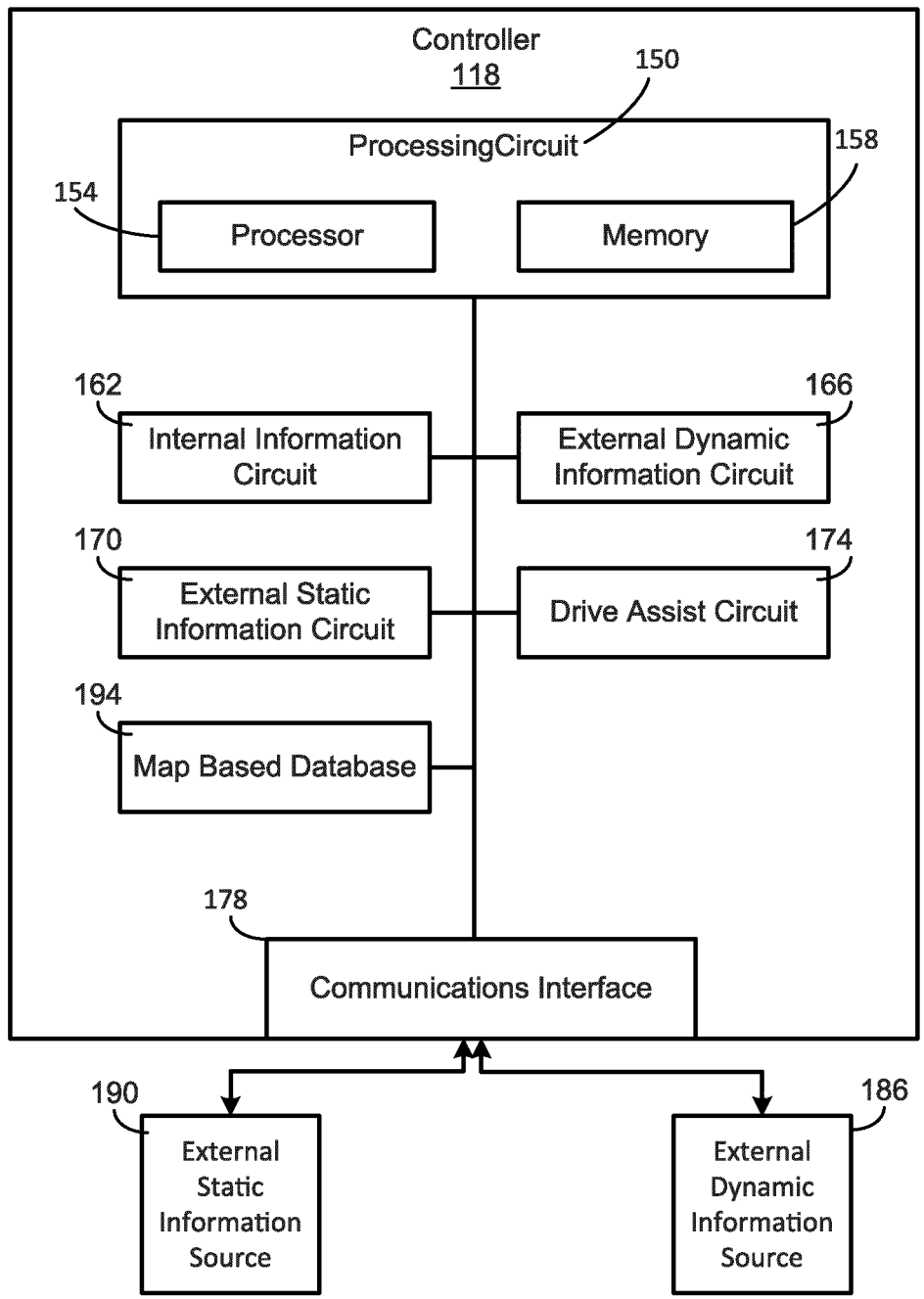
FIG. 3 is a schematic representation of a controller of the vehicle of FIG. 2, according to an example embodiment.

The controller 118 is structured to control the operation of the engine system 46 and associated sub-systems, such as the internal combustion engine 50 and the exhaust aftertreatment system 54. According to one embodiment, the components of FIGS. 2-3 are embodied in the vehicle 44. In some embodiments, the vehicle 44 may include an on-road or an off-road vehicle including, but not limited to, line-haul trucks, mid-range trucks (e.g., pick-up trucks), tanks, airplanes, and any other type of vehicle that utilizes an SCR system. Communication between and among the components may be via any number of wired or wireless connections. For example, a wired connection may include a serial cable, a fiber optic cable, a CAT5 cable, or any other form of wired connection. In comparison, a wireless connection may include the Internet, Wi-Fi, cellular, radio, etc. In one embodiment, a controller area network ("CAN") bus provides the exchange of signals, information, and/or data. The CAN bus includes any number of wired and wireless connections. Because the controller 118 is communicably coupled to the systems and components of FIG. 2, the controller 118 is structured to receive data from one or more of the components shown in FIG. 2. For example, the data may include NOx data (e.g., an incoming NOx amount from NOx sensor 122 and an outgoing NOx amount from NOx sensor 134), dosing data (e.g., timing and amount of dosing delivered from doser 82), and a vehicle operating data (e.g., engine speed, vehicle speed, engine temperature, etc.) received via one or more sensors. As another example, the data may include an input from operator I/O device 146. The structure and function of the controller 118 is further described in regard to FIG. 3.

Referring now to FIG. 3, a schematic diagram of the controller 118 of the vehicle of FIG. 2 is shown according to an example embodiment. As shown in FIG. 3, the controller 118 includes a processing circuit 150 having a processor 154 and a memory device 158, an internal information circuit 162, an external dynamic information circuit 166, an external static information circuit 170, a drive assist circuit 174, and the communications interface 178. Generally, the controller 118 is structured to dynamically assess information indicative of an operating condition of at least one vehicle subsystem, information indicative of external dynamic conditions, and/or information indicative of external static conditions and modulate the speed and/or the torque output of the engine 50 in response to the operating condition of the vehicle subsystem, the external dynamic condition, or the external static condition.

In one configuration, the internal information circuit 162, the external dynamic information circuit 166, the external static information circuit 170, and the drive assist circuit 174 are embodied as machine or computer-readable media that is executable by a processor, such as the processor 154. As described herein and amongst other uses, the machine-readable media facilitates performance of certain operations to enable reception and transmission of data. For example, the machine-readable media may provide an instruction (e.g., command, etc.) to, e.g., acquire data from a particular sensor or a virtual sensor. In this regard, the machine-readable media may include programmable logic that defines the frequency of acquisition of the data (or, transmission of the data). The computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the internal information circuit 162, the external dynamic information circuit 166, the external static information circuit 170, and the drive assist circuit 174 are embodied as hardware units, such as electronic control units. As such, the internal information circuit 162, the external dynamic information circuit 166, the external static information circuit 170, and the drive assist circuit 174 may be embodied as one or more circuitry components including, but not limited to, processing circuitry, network interfaces, peripheral devices, input devices, output devices, sensors, etc. In some embodiments, the internal information circuit 162, the external dynamic information circuit 166, the external static information circuit 170, and the drive assist circuit 174 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the internal information circuit 162, the external dynamic information circuit 166, the external static information circuit 170, and the drive assist circuit 174 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on). The internal information circuit 162, the external dynamic information circuit 166, the external static information circuit 170, and the drive assist circuit 174 may also include programmable hardware devices such as field programmable gate arrays, programmable array logic, programmable logic devices or the like. The internal information circuit 162, the external dynamic information circuit 166, the external static information circuit 170, and the drive assist circuit 174 may include one or more memory devices for storing instructions that are executable by the processor(s) of the internal information circuit 162, the external dynamic information circuit 166, the external static information circuit 170, and the drive assist circuit 174. The one or more memory devices and processor(s) may have the same definition as provided herein with respect to the memory device 158 and the processor 154. In some hardware unit configurations, the internal information circuit 162, the external dynamic information circuit 166, the external static information circuit 170, and the drive assist circuit 174 may be geographically dispersed throughout separate locations in the vehicle. Alternatively and as shown, the internal information circuit 162, the external dynamic information circuit 166, the external static information circuit 170, and the drive assist circuit 174 may be embodied in or within a single unit/housing, which is shown as the controller 118.

In the example shown in FIG. 3, the controller 118 includes a processing circuit 150 having the processor 154 and the memory device 158. The processing circuit 150 may be structured or configured to execute or implement the instructions, commands, and/or control processes described herein with respect to the internal information circuit 162, the external dynamic information circuit 166, the external static information circuit 170, and the drive assist circuit 174. Thus, the depicted configuration represents the internal information circuit 162, the external dynamic information circuit 166, the external static information circuit 170, and the drive assist circuit 174 as machine or computer-readable media. However, as mentioned above, this illustration is not meant to be limiting as the present disclosure contemplates other embodiments where the internal information circuit 162, the external dynamic information circuit 166, the external static information circuit 170, and the drive assist circuit 174 or at least one circuit of the internal information circuit 162, the external dynamic information circuit 166, the external static information circuit 170, and the drive assist circuit 174 is configured as a hardware unit. All such combinations and variations are intended to fall within the scope of the present disclosure.

The processor 154 may be implemented as one or more general-purpose processor, an application specific integrated circuit (ASIC), one or more field programmable gate arrays (FPGAs), a digital signal processor (DSP), a group of processing components, or other suitable electronic processing components. In some embodiments, the one or more processors may be shared by multiple circuits (e.g., the internal information circuit 162, the external dynamic information circuit 166, the external static information circuit 170, and the drive assist circuit 174 may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure. The memory device 158 (e.g., RAM, ROM, Flash Memory, hard disk storage, etc.) may store data and/or computer code for facilitating the various processes described herein. The memory device 158 may be communicably connected to the processor 154 to provide computer code or instructions to the processor 154 for executing at least some of the processes described herein. Moreover, the memory device 158 may be or include tangible, non-transient volatile memory or non-volatile memory. Accordingly, the memory device 158 may include database components, object code components, script components, or any other type of information structure for supporting the various activities and information structures described herein.

The communications interface 178 may be/include any combination of wired or wireless interfaces (e.g., jacks, antennas, transmitters, receivers, transceivers, wire terminals, etc.) for conducting data communications with various systems, devices, or networks 180. For example, the communications interface 178 may include an Ethernet card and port for sending and receiving data via an Ethernet-based communications network and/or a Wi-Fi transceiver for communicating via a wireless communications network. The communications interface 178 may be structured to communicate via local area networks or wide area networks (e.g., the Internet, etc.) and may use a variety of communications protocols (e.g., IP, LON, Bluetooth, ZigBee, radio, cellular, near field communication, etc.).

The communications interface 178 of the controller 118 may facilitate communication between and among the controller 118 and one or more components of the vehicle (e.g., components of vehicle subsystems (such as the engine system 46, exhaust aftertreatment system 54, and the powertrain system 182), the external dynamic information source 186, the external static information source 190, the operator I/O device 146, the sensors, etc.). Communication between and among the controller 118 and the components of the vehicle may be via any number of wired or wireless connections (e.g., any standard under IEEE 802, etc.). For example, a wired connection may include a serial cable, a fiber optic cable, a CAT5 cable, or any other form of wired connection. In comparison, a wireless connection may include the Internet, Wi-Fi, cellular, Bluetooth, ZigBee, radio, etc. In one embodiment, a controller area network (CAN) bus provides the exchange of signals, information, and/or data. The CAN bus can include any number of wired and wireless connections that provide the exchange of signals, information, and/or data. The CAN bus may include a local area network (LAN), or a wide area network (WAN), or the connection may be made to an external computer (for example, through the Internet using an Internet Service Provider).

The internal information circuit 162 may be communicably coupled to one or more sensors, physical or virtual, positioned throughout the vehicle subsystems such that the internal information circuit 162 may receive information indicative of an operating condition of at least one of the vehicle subsystems. The information indicative of the operating condition of at least one of the vehicle subsystems may include data regarding the powertrain system 182 (and other components in the vehicle). For example, the data regarding the powertrain system 182 may include, but is not limited to, the vehicle speed, the current transmission gear/setting, the load on the vehicle/engine, the throttle position, a set cruise control speed, data relating to the exhaust aftertreatment system 54, output power, engine speed, fluid consumption rate (e.g., fuel consumption rate, diesel exhaust fluid consumption rate, etc.), engine operating characteristics, etc. Data relating to the exhaust aftertreatment system 54 includes, but is not limited to, a temperature of the exhaust aftertreatment system 54, a temperature of exhaust gas in the exhaust aftertreatment system 54 at one or more locations (based on the position of the temperature sensors), NOx emissions at one or more locations (based on the position of the NOx sensors), particulate matter emissions at one or more locations (based on the position of the PM sensors), and conversion efficiency of one or more catalysts in the exhaust aftertreatment system 54 (e.g., the selective catalytic reduction catalyst). Data regarding traffic conditions and/or the operating conditions of vehicles proximate the vehicle may include traffic/vehicle speed, traffic/vehicle braking events, and location information of vehicles proximate the vehicle (e.g. vehicles adjacent the vehicle, vehicles before the vehicle, openings in lanes of traffic, etc.). The data regarding the traffic conditions and/or the operating conditions of the vehicles proximate the vehicle may be based on data received from radar, LIDAR, vehicle-to-vehicle (V2V), vehicle-to-infrastructure (V2I) sensors, etc.

The internal operating conditions of the at least one vehicle subsystem may be stored by the controller 118 and selectively transmitted to one or more desired sources (e.g., another vehicle such as in a vehicle-to-vehicle communication session, a remote operator, etc.). In other embodiments, the controller 118 may provide the information indicative of the operation of the vehicle subsystem to the drive assist circuit 174. All such variations are intended to fall within the spirit and scope of the present disclosure.

The external dynamic information circuit 166 is in electronic communication with an external dynamic information source 186. The external dynamic information source 186 may be any external dynamic information (e.g., data, value, etc.) provider, where external dynamic information refers to information or data that may vary as a function of both time and location (e.g., construction speed limits). In this regard, the external dynamic information source 186 may include any source capable of providing the information indicative of the external dynamic condition. Accordingly, the external dynamic information source 186 may include vehicle-to-vehicle communications. In this regard, the vehicle may communicate with one or more other vehicles directly (e.g., via NFC, etc.) to obtain data regarding one or more future conditions for the vehicle. In another embodiment, the external dynamic information source 186 may include a vehicle-to-X configuration, where the "X" refers to any remote information providing source. For example, the remote information providing source may include one or more servers, computers, mobile devices, infrastructure components, etc. Accordingly, the external dynamic information may include, but is not limited to, a traffic density at a particular location at a particular time, a weather condition at a particular location at a particular time, etc. It should be understood that the present disclosure contemplates other sources of external dynamic information sources, such that the depicted examples are not meant to be limiting or intended to be the only type of dynamic information source contemplated.

The external static information circuit 170 is in electronic communication with an external static information source 190. The external static information source 190 may be any information (e.g., data, value, etc.) provider capable of providing external static information, where external static information refers to information or data indicative of external static conditions that may vary as a function of position (e.g., the grade of the road may vary along a route) but is substantially unchanging with respect to time. In this regard, the external static information source 190 may include one or more map based databases 194, where the map based database 194 includes static information including, but not limited to, road grade data (e.g., the road grade at various spots along various routes), speed limit data (e.g., posted speed limits in various road locations), elevation or altitude data at various points along a route, curvature data at various points along a route, location of intersections along a route, etc. It should be understood that the present disclosure contemplates other sources of external static information (e.g., a global positioning system satellite that provides latitude, longitude, and/or elevation data), such that the database configuration is not meant to be limiting or intended to be the only type of static information source contemplated.

The drive assist circuit 174 controls driver assist modes in which a controller on the vehicle has at least partial control over the operation of the vehicle. For example, when operating in the driver assist mode, the drive assist circuit 174 may control a speed of an engine according to a predetermined speed input via the operator I/O device 146, and the operator may steer and brake the vehicle (e.g., cruise control). In other embodiments, the drive assist mode may be a semi-autonomous mode in which the drive assist circuit 174 determines the speed and/or the torque output of the engine based on the operating conditions of one of the vehicle subsystems, the external dynamic conditions, and/or the external static conditions, and the driver may have control over a steering system of the vehicle. In other embodiments, the driver assist mode is a fully autonomous mode in which the drive assist circuit 174 determines the speed and/or the torque output of the engine and steers the vehicle based on the operating conditions of a vehicle subsystem, the external dynamic conditions (e.g., information for a route that changes as a function of time), and/or the external static conditions (e.g., route grade data).

The trajectory controller 120 is structured to determine a trajectory (e.g. a route) of the vehicle 44. Communication between and among the controller 118 and the trajectory controller 120 may be via any number of wired or wireless connections. In comparison, a wireless connection may include the Internet, Wi-Fi, cellular, radio, etc. In one embodiment, a controller area network ("CAN") bus provides the exchange of signals, information, and/or data. The CAN bus includes any number of wired and wireless connections. In some embodiments, the trajectory controller 120 is a cloud-based controller, and in other embodiments, the trajectory controller 120 is positioned on the vehicle 44. Determining the trajectory of the vehicle is a computationally-intense process, so in some embodiments the trajectory controller 120 is structured to reduce a computing power by required by the controller 118 and onboard vehicle systems by computing the trajectory of the vehicle 44 in the cloud.

Figure 4:
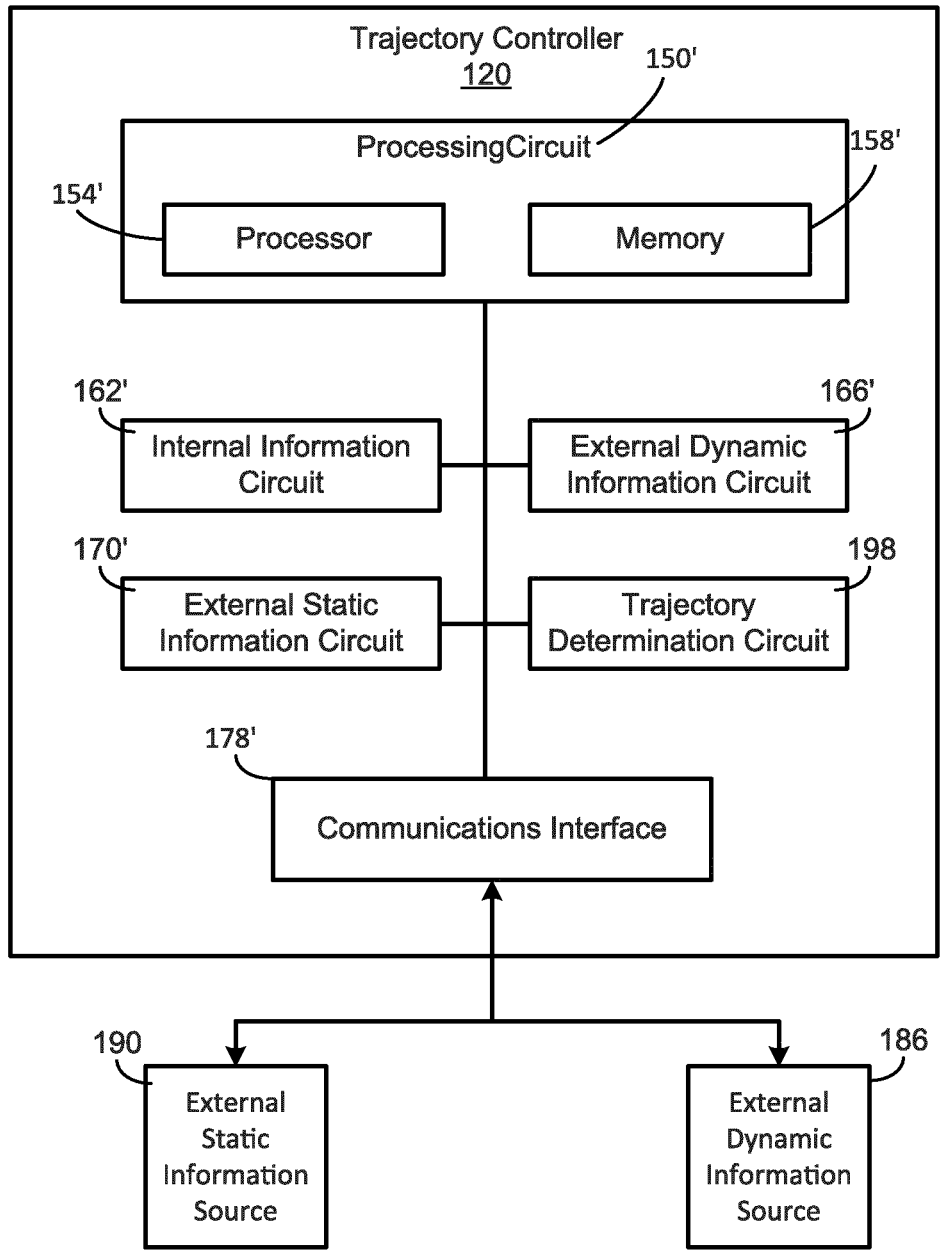
FIG. 4 is a schematic representation of a second controller of the vehicle of FIG. 2 according to an example embodiment.

Referring now to FIG. 4, a schematic diagram of the trajectory controller 120 of the vehicle 44 of FIG. 2 is shown according to an example embodiment. As shown in FIG. 4, the trajectory controller 120 includes a processing circuit 150' having a processor 154' and a memory device 158', an internal information circuit 162', an external dynamic information circuit 166', an external static information circuit 170', a trajectory determination circuit 198, and a communications interface 178'. The processing circuit 150', the processor 154', the memory device 158', the internal information circuit 162', the external dynamic information circuit 166', the external static information circuit 170', and the communication interface 178' are substantially the same as the processing circuit 150, the processor 154, the memory device 158, the internal information circuit 162, the external dynamic information circuit 166, the external static information circuit 170, and the communications interface 178 of the controller 118. Generally, the trajectory controller 120 is structured to dynamically assess information indicative of the external static and dynamic conditions to determine a trajectory of the vehicle 44. The trajectory controller 120 is further structured to determine a series of set points of at least one vehicle subsystem based on the information indicative of the external static and dynamic conditions. The trajectory controller 120 is further structured to assess information indicative of the operating condition of the at least one vehicle subsystem to update (e.g. change) the series of set points of the at least one vehicle subsystem based on the operating condition of the at least one vehicle subsystems.

The trajectory determination circuit 198 is structured to determine a trajectory (e.g. a route) of the vehicle operating in a driver assist mode in which the controller 118 has at least partial control over the operation of the vehicle 44. In embodiments in which two or more trajectories exist between a starting point and an ending point of the vehicle 44, the trajectory determination circuit 198 is structured to determine a predicted fuel efficiency of the at least two trajectories and command the vehicle 44 to follow the trajectory having the higher fuel efficiency.

Figure 5:
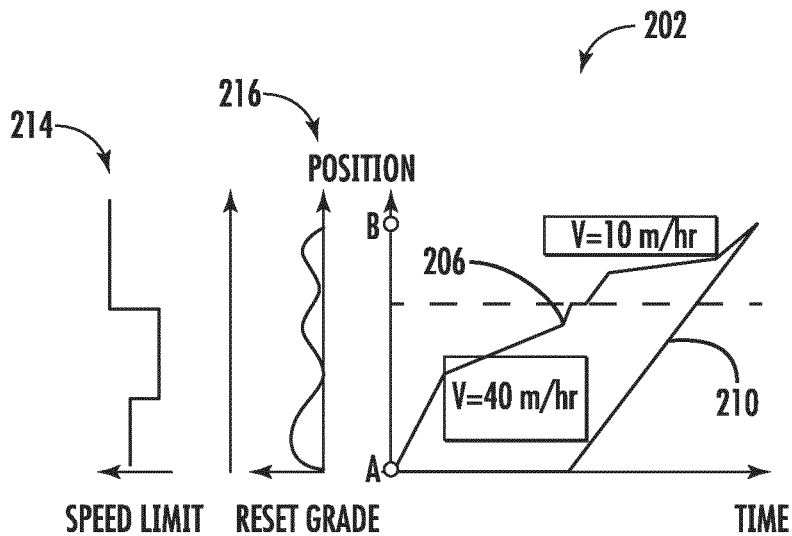
FIG. 5 is a schematic illustration showing a prediction of a route trajectory of the vehicle based on an external static condition and an external dynamic condition, according to an example embodiment.

FIG. 5 illustrates an exemplary position v.s. time plot 202 showing a first trajectory 206 and a second trajectory 210 extending between position A and position B, a plot 214, which indicates posted speed limits along the first trajectory 206, and a plot 216, which indicates road grade conditions along the first trajectory 206. Plot 214 indicates changes in the posted speed limits along the first trajectory 206, an exemplary external static condition. Plot 216 indicates changes in road grade along the first trajectory 206, another exemplary static condition. The trajectory determination circuit 198 accounts for the effects of the changing speed limits shown in plot 214 and the changing road conditions shown in plot 216 on the dynamics of the engine system 46 and powertrain system when determining the first trajectory 206. As indicated in plot 202, the first trajectory 206 includes many changes in speed limit and road grade, which can require gearshifts and fuel cut events, which can decrease fuel efficiency. The second trajectory 210 has more consistent speeds and/or road grade conditions, although the second trajectory 210 covers a longer distance than the first trajectory 206. Accordingly, the trajectory determination circuit 198 may determine that the second trajectory 210 is more fuel efficient than the first trajectory 206 and command the vehicle to follow the second trajectory 210.

Figure 6:
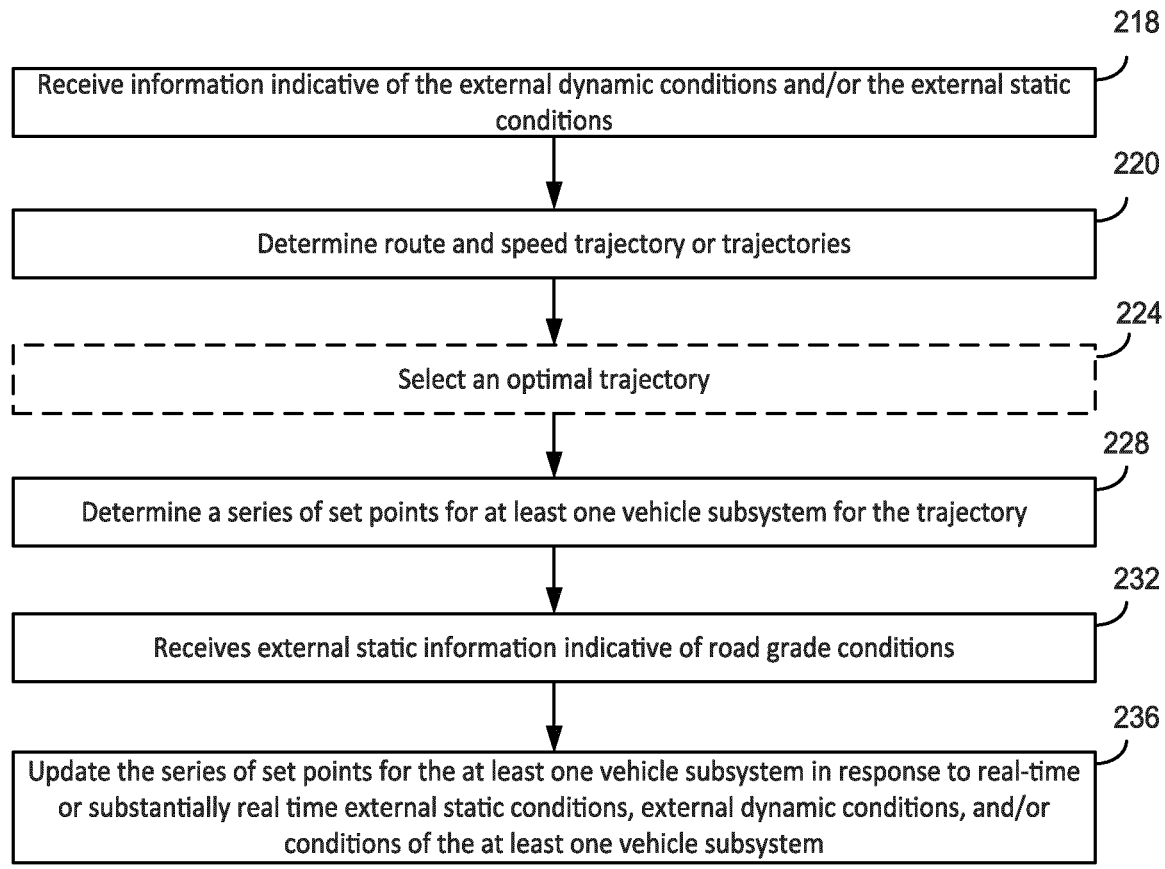
FIG. 6 is a flow diagram of a method for controlling a dynamic response of the an engine, a powertrain, an/or a vehicle subsystem according to the predicted route trajectory of FIG. 5 and internal operating conditions of the vehicle subsystem, according to an example embodiment.

In the exemplary embodiment shown in FIG. 6, the trajectory determination circuit 198 receives information indicative of the external dynamic conditions (e.g. weather and traffic conditions) and the external static conditions (e.g. road grade, road geometry, posted speed limits) (process 218). The trajectory determination circuit 198 then determines a long horizon trajectory or possible long horizon trajectories based on the external static condition and the external dynamic condition (process 220). The long horizon trajectory is a trajectory that is projected up to approximately 50 miles ahead of a current position of the vehicle. In some embodiments, the trajectory determination circuit 198 can perform the process 220 off-board from the vehicle using the cloud. In other embodiments, the trajectory determination circuit 198 can perform the process 220 locally in a computing system on board the vehicle. In embodiments in which at least two trajectories exist between a starting point and an ending point of the vehicle, the trajectory determination circuit 198 selects an optimal trajectory (process 224). In some embodiments, the optimal trajectory can be the trajectory having the most fuel efficiency, the trajectory having the shortest physical distance, and/or the trajectory having the shortest travel time.

Returning to FIG. 6, a series of set points for at least one vehicle subsystem is determined for the optimal trajectory based on the path of the optimal trajectory, the external static environmental conditions (e.g. road grade, road curvature, and posted speed limits), the external dynamic conditions (e.g. the speed of cars and/or traffic ahead of the vehicle), and the operating condition of the at least one vehicle subsystem (process 228). In some embodiments, the series of set points is determined by the trajectory determination circuit 198. In other embodiments, the series of set points is determined by the drive assist circuit 174. The series of set points forms a short-horizon operating trajectory of the vehicle and is based on the external static conditions and the external dynamic conditions occurring up to 5 miles ahead of the vehicle. The drive assist circuit 174 then controls the at least one vehicle subsystem according to the series of set points for the at least one vehicle subsystem. As the vehicle travels along the optimum trajectory, the trajectory determination circuit 198 and/or the drive assist circuit 174 receives information indicative of operating conditions of at least one of the vehicle subsystems, the external static conditions, and the external dynamic conditions (process 232). In some embodiments, the information indicative of operating conditions of at least one of the vehicle subsystems, the external static conditions, and the external dynamic conditions is received in real time or substantially real time. In response to determining that a change in the engine dynamics, powertrain dynamics, and/or vehicle subsystem is required based on the operating conditions of the at least one vehicle subsystems, the external static conditions, and/or the external dynamic conditions, the trajectory determination circuit 198 and/or the drive assist circuit 174 recalculates the series of set points for the at least one vehicle subsystem (process 236).

In some embodiments, the trajectory determination circuit 198 can predict the cumulative NOx emissions of the vehicle for a trajectory of the vehicle. The trajectory determination circuit 198 can set the set points of the engine system or force the engine system operation (combustion referencing) to lowest brake specific fuel consumption when the predicted emissions of the vehicle are below a target amount of NOx emissions.

Figure 7:
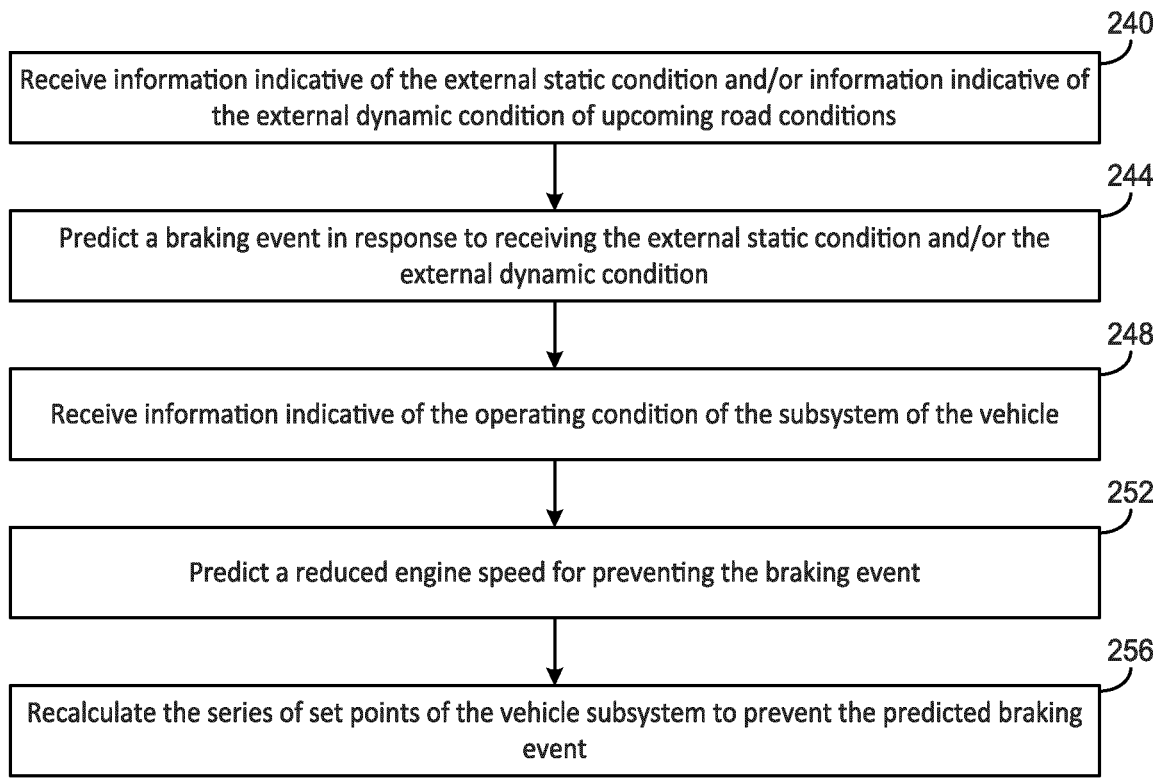
FIG. 7 is a flow diagram of a method for controlling an engine of a vehicle in response to a predicted fuel cut event, according to an example embodiment.

FIG. 7 illustrates an exemplary embodiment in which the drive assist circuit 174 controls the vehicle in accordance with the short-horizon trajectory and the condition of the vehicle subsystems, external dynamic conditions, and external static conditions. In the exemplary embodiment shown in FIG. 7, the drive assist circuit 174 may receive information indicative of external dynamic road conditions such as a presence of a slower vehicle, traffic, or a weather condition ahead of the vehicle, or the drive assist circuit 174 may receive external static information indicative of external static road conditions such as a future curve in the road (process 240). Based on the external dynamic condition or the external static condition received by the drive assist circuit 174, the drive assist circuit 174 may predict a braking event (process 244). The drive assist circuit 174 is further structured to receive information indicative of the operating condition of the subsystem of the vehicle (process 248). In the present embodiment, the subsystem of the vehicle is the engine 50 and the information indicative of the operating condition of the subsystem of the vehicle is a current operating speed and/or operating torque of the engine 50. In response to predicting the braking event, the drive assist circuit 174 may predict a reduced engine speed to prevent the braking event based on the external dynamic information such as a density of traffic in front of the vehicle, the information indicative of the weather condition, such as forecasted weather conditions, or the external static information indicative of the future curve, and the operating condition of the engine 50 of the vehicle (process 252). The drive assist circuit 174 may the recalculate the series of set points of the vehicle subsystem (e.g. engine output speed set points, engine output torque set points, and/or fuel injection set points) to prevent the predicted braking event (process 256). Accordingly, the drive assist circuit 174 is structured to decrease the speed of the engine 50 to prevent and/or reduce use of the service brakes in response to the predicted traffic or curve in the road. In other exemplary embodiments, when the vehicle operates on a trajectory that includes a variable road grade (e.g. uphill and downhill) conditions, the vehicle may be controlled according to both the road grade conditions (external static conditions) and the traffic conditions ahead of the vehicle (external dynamic conditions). For example, when the vehicle is traveling along a downhill road grade and detects another vehicle in front of the vehicle, the trajectory determination circuit 198 and/or the drive assist circuit 174 receives information indicative of the speed of the vehicle in front of the vehicle. Accordingly, a speed of the vehicle can be adjusted (e.g. by the trajectory determination circuit 198 and/or the drive assist circuit 174) optimally in terms of both the road grade conditions and the speed of the vehicle in front of the vehicle to prevent future braking and loss of vehicle kinetic energy. Additionally, the trajectory determination circuit 198 and/or the drive assist circuit 174 can recommend an optimal lane position for the vehicle considering traffic surrounding the vehicle, so that unwanted braking is avoided. For example, responsive to determining, based on the external dynamic conditions, that a slower vehicle and/or slow traffic is present in front of the vehicle, the drive assist circuit 174 can command the vehicle to make a lane change. In some embodiments, the trajectory determination circuit 198 and/or the drive assist circuit 174 can further modulate a speed of the vehicle to increase fuel efficiency by, responsive to receiving information indicative of an upcoming turn, a speed and/or a speed increase of the engine 50 can be limited so the vehicle can travel the turn without using service brakes, which can improve fuel economy. In some embodiments, in response to determining that the upcoming road conditions are indicative of an increase of the temperature of the engine 50, the controller 118 is structured to prevent the vehicle 44 from using a heater to heat the exhaust aftertreatment system 54. In some embodiments, the drive assist circuit 174 can predict an upcoming a fueling event and/or a max fueling event based on receiving information indicative of an upcoming hill or based on receiving information about traffic conditions requiring an increase in engine 50 output speed or an increase in engine 50 torque, such as a predicted merge.

Figure 8:
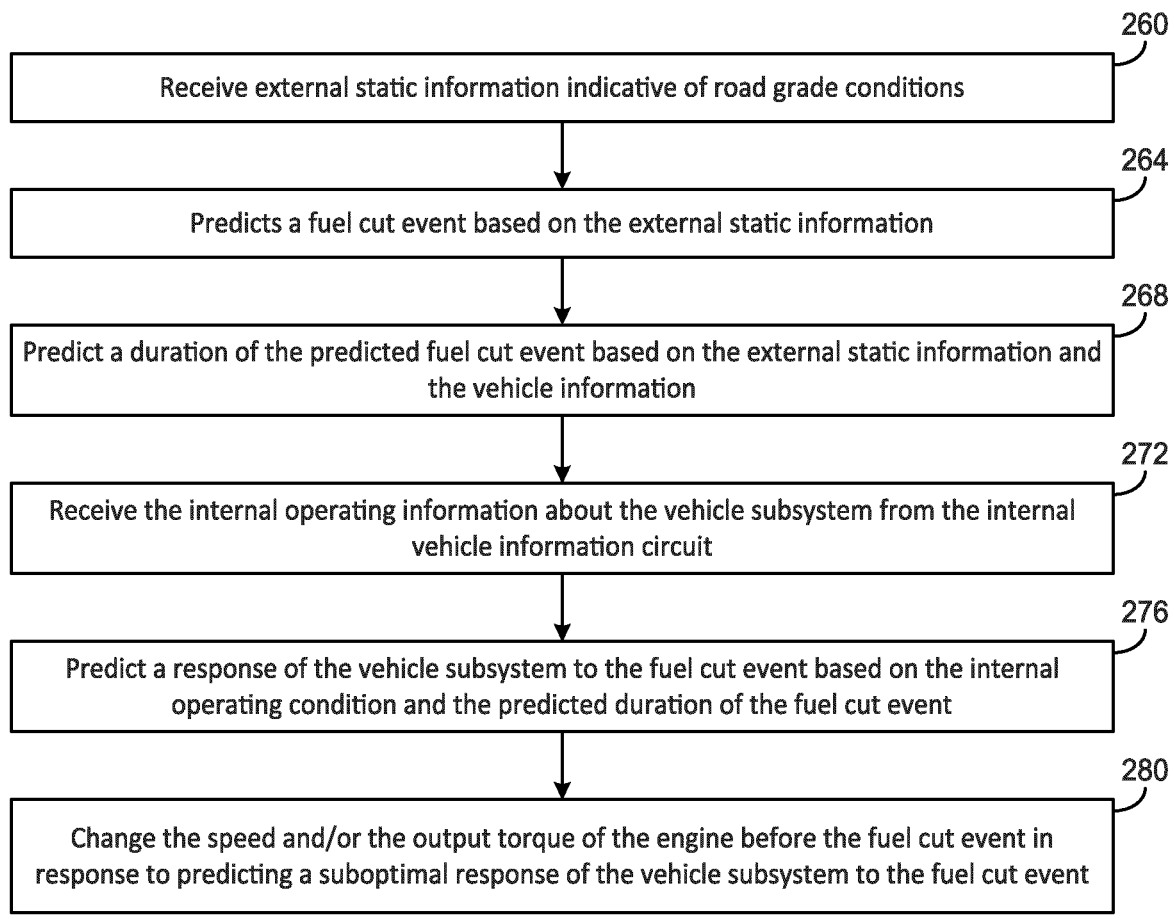
FIG. 8 is a flow diagram of a method for controlling an engine of a vehicle in response to a predicted fuel cut event, according to another example embodiment.

FIG. 8 illustrates an exemplary method of controlling a response of a vehicle subsystem to a predicted fuel cut event. As shown in FIG. 8, the drive assist circuit 174 is structured to receive the internal operating condition of the vehicle subsystem, the external static condition, and the external dynamic condition from each of the internal information circuit 162, the external dynamic information circuit 166, and the external static information circuit 170, respectively (process 260). In response to receiving the external static condition and/or the external dynamic condition, the drive assist circuit 174 is structured to predict a fuel cut event of the engine 50 (process 264). As is described in more detail below, the drive assist circuit 174 may predict the fuel cut event by analyzing the external static and/or external dynamic information. For example, the drive assist circuit 174 may predict the fuel cut event by sensing, predicting, or otherwise determining a downhill portion of the road or by sensing, receiving data indicative of, or otherwise determining slow traffic conditions ahead of the vehicle. The drive assist circuit 174 then predicts a duration of the fuel cut event based on the operating condition of the vehicle subsystem, the external static condition, and/or the external dynamic condition (process 268). For example, the drive assist circuit 174 may predict the duration of the fuel cut event based on a grade of the downhill portion of the route, a weight of the vehicle, and/or an operating condition (e.g. speed) of the vehicle. In response to predicting the fuel cut event and/or the duration of the fuel cut event, the drive assist circuit 174 is structured to receive the internal operating information from the internal information circuit 162 (process 272). The drive assist circuit 174 is then structured to predict the response of the vehicle subsystem to the fuel cut event based on the internal operating condition and the duration of the fuel cut event (process 276). For example, in some embodiments, the internal operating information is the temperature of the exhaust gas entering the exhaust aftertreatment system 54 or the temperature of the exhaust aftertreatment system 54. Based on the predicted duration of the predicted fuel cut event and the temperature of the exhaust gas entering the exhaust aftertreatment system 54 or the temperature of the exhaust aftertreatment system 54, the drive assist circuit 174 can determine whether the temperature of the exhaust gas or the exhaust aftertreatment system 54 will drop below the low temperature threshold of the exhaust aftertreatment system 54 during the fuel cut event. In response to predicting a suboptimal response of the vehicle subsystem to the fuel cut event, the drive assist circuit 174 is structured to change the speed and/or the output torque of the engine 50 before the fuel cut event (process 280). For example, in embodiments in which the temperature of the exhaust gas or the temperature of the exhaust aftertreatment system 54 is predicted to fall below the low temperature threshold during the fuel cut event, the drive assist circuit 174 can increase the speed and/or the torque output of the engine to increase the temperature of the exhaust gas or the exhaust aftertreatment system 54 before the fuel cut event to a temperature high enough to prevent the temperature of the exhaust gas or the exhaust aftertreatment system 54 from falling below the low temperature threshold during the fuel cut event.

The embodiment of FIG. 8 is structured to reduce an amount of work done by the engine 50 (and/or an amount of fuel used by the engine 50) by adjusting the speed, the series of speed set points, the engine fueling conditions, the engine fueling set points, and/or a torque demand of the engine 50 in response to predicted future conditions based on external dynamic information, external static information, and the operating conditions of one or more of the vehicle subsystem (e.g. the exhaust aftertreatment system 54). In some embodiments, the integration of the engine 50 and the exhaust aftertreatment system 54 dynamics in the controller (e.g. the drive assist circuit 174 and/or the trajectory determination circuit 198) provides feasible and optimal demand torque subject to internal operating conditions of the engine 50 and the exhaust aftertreatment system 54. In some embodiments, based on the information indicative of future external dynamic conditions and future external static conditions and integrating the operating conditions (e.g. dynamics) of the exhaust aftertreatment system 54 into the vehicle speed and/or load determinations made by the drive assist circuit 174, an optimal decision can be made to modulate the engine 50 of the vehicle to reduce a load on the engine 50 during sufficiently large downhill operations or to modulate the engine 50 of the vehicle to maintain a high temperature of the exhaust aftertreatment system 54 (or a component of the exhaust aftertreatment system 54, such as the SCR catalyst) or modulate the speed or the torque demand of the engine 50 to increase the temperature of the exhaust aftertreatment system 54 in advance of the downhill conditions and/or operating engine to keep exhaust flow temperature high enough during downhill conditions. The trade-off between modulating the engine 50 to reduce the load on the engine 50 or to maintain the temperature of the exhaust aftertreatment system 54 can be accomplished in a predictive and optimal fashion by taking into the operating conditions of one or more of the vehicle subsystems (e.g. the exhaust aftertreatment system 54 and/or the engine 50) and the external dynamic conditions and the external static conditions into account when the engine speed and/or torque is determined by the drive assist circuit 174 when the vehicle is operating in the driver assist mode.

Figure 9:
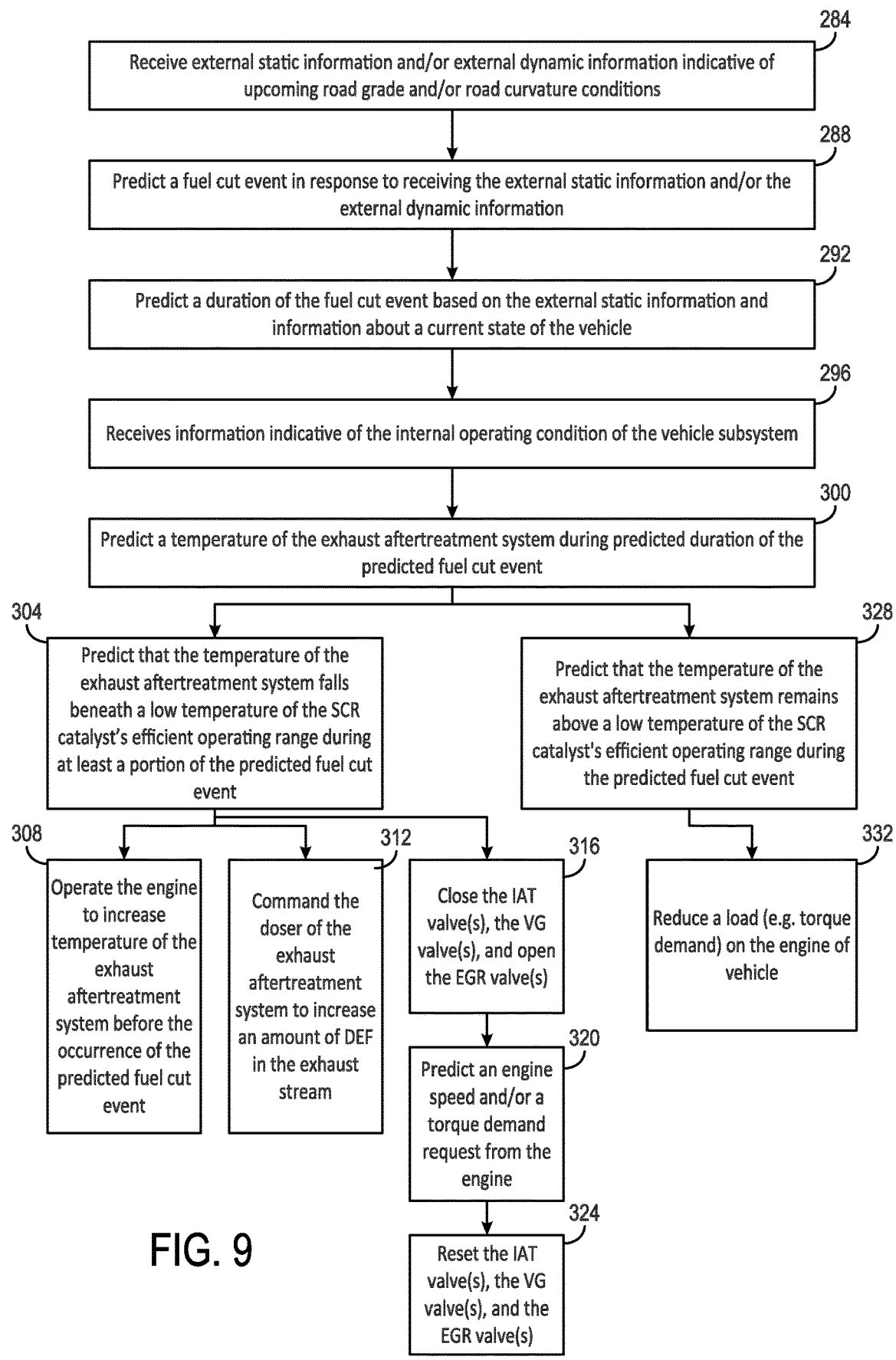
FIG. 9 is a flow diagram of a method for controlling an engine of a vehicle in response to a predicted braking event, according to an example embodiment.

As shown in FIG. 9, in an exemplary embodiment, the drive assist circuit 174 can receive external static information or external dynamic information indicative of the future road grade conditions (process 284). The external static information can include an indication that an uphill portion of the road may decrease to a less steep uphill road grade, a substantially flat road grade, or a downhill road grade, an indication that a substantially flat road grade will decrease to a generally downhill road grade, or information indicative of a future curve in the road. The external dynamic information may include information indicative of the future road conditions such as a presence of a slower vehicle, traffic, or a weather condition ahead of the vehicle. Based on the external static condition and/or the external dynamic condition, the drive assist circuit 174 may predict a fuel cut event (process 288). In response to predicting the fuel cut event, the drive assist circuit 174 may predict a duration of the fuel cut event based on external static conditions such as a distance of the decrease in road grade and/or current vehicle operating conditions, such as a speed of the vehicle (process 292). For example, the drive assist circuit 174 can predict the duration of the fuel cut event based on the grade of the downhill portion, the length of the downhill portion, and the desired speed and/or load of the engine. More specifically, in such an embodiment, the drive assist circuit 174 can predict the length of the fuel cut event by determining how long the vehicle can operate according to the speed/engine load selected by the user while on the downhill portion of the route without requiring fueling of the engine. In other embodiments, the drive assist circuit 174 can predict the duration of the fuel cut event based on a density and/or speed of slow-moving traffic conditions. For example, in such an embodiment, the drive assist circuit 174 can predict the length of the fuel cut event by determine how long the vehicle can travel towards and/or with the slow moving traffic before supplying fuel to the engine or braking the vehicle. In other embodiments, the drive assist circuit 174 can predict the duration of the fuel cut event based on information indicative of current and/or upcoming weather conditions requiring a reduced engine speed. For example, in such an embodiment, the drive assist circuit 174 can predict the length of the fuel cut event by determining how long the vehicle is expected to encounter the predicted weather conditions requiring the reduced speed and how long the vehicle can coast before acceleration (and engine fueling) is necessary.

The drive assist circuit 174 is further structured to receive information indicative of the operating condition of the subsystem of the vehicle (process 296). In the present embodiment, the subsystem of the vehicle is the exhaust aftertreatment system 54 and the information indicative of the operating condition of the subsystem of the vehicle is a temperature of the exhaust aftertreatment system 54. The drive assist circuit is further structured to predict a temperature of the exhaust aftertreatment system 54 during the predicted duration of the predicted fuel cut event (process 300). In some embodiments, the temperature of the exhaust aftertreatment system 54 is predicted based on the thermal dynamics of the exhaust aftertreatment system 54 and the predicted duration of the fuel cut event, the engine 50 speed before the fuel cut event, and the temperature of the exhaust aftertreatment system 54 before the fuel cut event. In some embodiments, the thermal dynamics of the exhaust aftertreatment system 54 can be saved in the memory device 158 as a look-up table or as a physical model.

Returning to FIG. 9, in response to predicting that the temperature of the exhaust aftertreatment system 54 falls below the low temperature threshold during at least a portion of the duration of the predicted fuel cut event (process 304), the drive assist circuit 174 is structured to operate the engine 50 to increase a temperature of the exhaust aftertreatment system 54 before the occurrence of the predicted fuel cut event (process 308). For example, the drive assist circuit 174 is structured to increase the torque demand and/or the speed of the engine 50 to increase the temperature of the exhaust aftertreatment system 54 to a temperature sufficient to prevent and/or reduce an amount of time that the temperature of the exhaust aftertreatment system 54 is below the low temperature threshold during the fuel cut event. Alternatively, in response to predicting a reduced efficiency of the SCR catalyst 70 during the fuel cut event due to the temperature of the exhaust gas and/or the exhaust aftertreatment system 54 falling beneath the low temperature threshold, the drive assist circuit 174 can command the doser 82 of the exhaust aftertreatment system 54 to increase an amount of DEF in the exhaust stream to compensate for the less efficient operation of the SCR catalyst of the exhaust aftertreatment system due to the lower temperature of the exhaust aftertreatment system 54 during the fuel cut event (process 312). In some embodiments, the drive assist circuit 174 can command the valves of the air intake subsystem ("TAT valves") to close, command the variable geometry ("VG") valves to close, and open the exhaust gas recirculation ("EGR") valve to warm the temperature of the exhaust aftertreatment system 54 during the fuel cut event (process 316). In response to predicting a future demand for speed and/or torque output from the engine (e.g. based on external dynamic conditions and/or external static conditions) (process 320), the drive assist circuit 174 resets the positions of the TAT valves, the VG valves, and the EGR valves to allow a transient response of the engine 50 (process 324). For example, drive assist circuit 174 can predict an upcoming a fueling event and/or a max fueling event based on receiving information indicative of an upcoming hill or based on receiving information about traffic conditions requiring an increase in engine 50 output speed or an increase in engine 50 torque, such as a predicted merge.

Returning to process 300 of FIG. 9, in response to predicting that the temperature of the exhaust aftertreatment system 54 will not or likely will not fall beneath the low temperature threshold during at least a portion of the predicted fuel cut event (process 328), the drive assist circuit 174 may reduce a load (e.g., the torque demand) on the engine 50 of the vehicle (process 332). For example, when the vehicle is operating under downhill road conditions and the drive assist circuit 174 has predicted that the temperature of the exhaust aftertreatment system 54 will not fall below the low temperature threshold during the fuel cut event, the drive assist circuit 174 can reduce the load on the engine 50 by reducing the engine speed or the engine torque, resulting in fuel savings.

In some embodiments, the integration of the external static and dynamic conditions of future conditions, the temperature of the exhaust aftertreatment system 54, and the adjustment of the speed of the engine 50, the torque output of the engine 50, and/or fueling of the engine 50 can be controlled according to a driver assist mode (e.g. cruise control, semi-autonomous control, and/or autonomous mode) to optimally adjust the set points of the engine 50 and/or combustion systems the predicted engine operating conditions as described above.

No claim element herein is to be construed under the provisions of 35 U.S.C. § 112(f), unless the element is expressly recited using the phrase "means for."

For the purpose of this disclosure, the term "coupled" means the joining or linking of two members directly or indirectly to one another. Such joining may be stationary or moveable in nature. For example, a propeller shaft of an engine "coupled" to a transmission represents a moveable coupling. Such joining may be achieved with the two members or the two members and any additional intermediate members. For example, circuit A communicably "coupled" to circuit B may signify that circuit A communicates directly with circuit B (i.e., no intermediary) or communicates indirectly with circuit B (e.g., through one or more intermediaries).

While various circuits with particular functionality are shown in FIGS. 3 and 4, it should be understood that the controller 118 and the trajectory controller 120 may include any number of circuits for completing the functions described herein. For example, the activities and functionalities of the circuits 162-174, 162'-174', and 198 may be combined in multiple circuits or as a single circuit. Additional circuits with additional functionality may also be included. Further, the controller 118 and the trajectory controller 120 may further control other activity beyond the scope of the present disclosure.

As mentioned above and in one configuration, the "circuits" may be implemented in machine-readable medium for execution by various types of processors, such as the processor 154 of FIG. 3 and the processor 154' of FIG. 4. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, the term "processor" and "processing circuit" are meant to be broadly interpreted. In this regard and as mentioned above, the "processor" may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example, the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

Although the diagrams herein may show a specific order and composition of method steps, the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. All such modifications are intended to be included within the scope of the present disclosure as defined in the appended claims. Such variations will depend on the machine-readable media and hardware systems chosen and on designer choice. All such variations are within the scope of the disclosure.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principles of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A system, comprising:
 a controller structured to:
  receive information indicative of an operating condition of a vehicle subsystem, of a vehicle, wherein the vehicle subsystem is an exhaust aftertreatment system in exhaust-gas receiving communication with an engine of the vehicle, and wherein the information indicative of the operating condition of the vehicle subsystem is a temperature of the exhaust aftertreatment system;
  receive information indicative of an external static condition;
  receive information indicative of an external dynamic condition;
  predict a fuel cut event based on at least one of the operating condition of the vehicle subsystem, the external static condition, or the external dynamic condition; and
  responsive to predicting a fuel cut event, modulate at least one of a torque or a speed of the engine based on the operating condition of the vehicle subsystem and at least one of the external static condition or the external dynamic condition.

2. The system of claim 1, wherein responsive to predicting a low temperature of the exhaust aftertreatment system based on at least one of the operating condition of the vehicle subsystem, the external static condition, or the external dynamic condition, modulating at least one of a torque or a speed of the engine to increase the temperature of the exhaust aftertreatment system.

3. The system of claim 1, wherein the controller is further structured to:
predict a duration of the fuel cut event based on at least one of the operating condition of the vehicle subsystem, the external static condition, or the external dynamic condition;
predict the temperature of the exhaust aftertreatment system during the fuel cut event based on the predicted duration of the fuel cut event; and
responsive to the predicted temperature of the exhaust aftertreatment system during the fuel cut event being above a predetermined temperature threshold, modulating at least one of the torque or the speed of the engine to reduce a load on the engine during the fuel cut event.

4. The system of claim 1, wherein:
the external static condition includes grade data for a route of a vehicle; and
the external dynamic condition includes information for a route that changes as a function of time.

5. The system of claim 1, wherein the controller is structured to operate in a driver assist mode in which the controller is structured to receive a command indicative of a target speed and to operate the engine so that the speed of the engine is within a predetermined range of the target speed responsive to predicting the fuel cut event.

6. A system, comprising:
a controller structured to:
receive information indicative of an operating condition of a vehicle subsystem of a vehicle;
receive information indicative of an external static condition;
receive information indicative of an external dynamic condition;
predict a fuel cut event based on at least one of the operating condition of the vehicle subsystem, the external static condition, or the external dynamic condition;
responsive to predicting a fuel cut event, modulate at least one of a torque or a speed of an engine of the vehicle based on the operating condition of the vehicle subsystem and at least one of the external static condition or the external dynamic condition; and
wherein the controller is structured to operate in a driver assist mode in which the controller is structured modulate at least one of the torque or the speed of the engine to reduce at least one of a number or a duration of fuel cut events.

7. An apparatus, comprising:
an internal information circuit structured to receive information indicative of an operating condition of a vehicle subsystem of a vehicle, wherein the vehicle subsystem is an exhaust aftertreatment system in exhaust-gas receiving communication with an engine of the vehicle, and wherein the operating condition of the vehicle subsystem is a temperature in the exhaust aftertreatment system;
an external dynamic information circuit structured to receive information indicative of an external dynamic condition of the vehicle;
an external static information circuit structured to receive information indicative of an external static condition of the vehicle; and
a drive assist circuit structured to:
predict a fuel cut event based on at least one of the operating condition of the vehicle subsystem, the external static condition, or the external dynamic condition; and
modulate at least one of a torque or a speed of the engine in response to the operating condition of the vehicle subsystem and at least one of the external static condition or the external dynamic condition.

8. The apparatus of claim 7, wherein responsive to predicting a predetermined temperature threshold of the exhaust aftertreatment system based on at least one of the operating condition of the vehicle subsystem, the external static condition, or the external dynamic condition, the drive assist circuit is structured to modulate at least one of a torque or a speed of the engine to increase the temperature of the exhaust aftertreatment system.

9. The apparatus of claim 7, wherein the drive assist circuit is further structured to:
predict a duration of the fuel cut event based on at least one of the operating condition of the vehicle subsystem, the external static condition, or the external dynamic condition;
predict the temperature of the exhaust aftertreatment system during the fuel cut event based on the predicted duration of the fuel cut event; and
responsive to the predicted temperature of the exhaust aftertreatment system during the fuel cut event being above a predetermined temperature threshold, modulating at least one of the torque or the speed of the engine to reduce a load on the engine during the fuel cut event.

10. The apparatus of claim 7, wherein:
the external static condition includes grade data for a route of a vehicle; and
the external dynamic condition includes information for the route of the vehicle that changes as a function of time.

11. The apparatus of claim 7, further comprising an input circuit structured to receive a command indicative of a target speed, and wherein the drive assist circuit is structured to operate the engine so that the speed of the engine is within a predetermined range of the target speed responsive to predicting the fuel cut event.

12. An apparatus, comprising:
an internal information circuit structured to receive information indicative of an operating condition of a subsystem of a vehicle;
an external dynamic information circuit structured to receive information indicative of an external dynamic condition of the vehicle;
an external static information circuit structured to receive information indicative of an external static condition of the vehicle; and
a drive assist circuit structured to:
predict a fuel cut event based on at least one of the operating condition of the vehicle subsystem, the external static condition, or the external dynamic condition; and
modulate at least one of a torque or a speed of an engine of the vehicle in response to the operating condition of the vehicle subsystem and at least one of the external static condition or the external dynamic condition, wherein the drive assist circuit is structured to modulate at least one of the torque or the speed of the engine to reduce one of a number of or a duration of fuel cut events.

13. A method, comprising:
receiving information indicative of an operating condition of a vehicle subsystem of a vehicle, wherein the vehicle subsystem is an exhaust aftertreatment system in exhaust-gas receiving communication with an engine of the vehicle, and wherein the operating condition of the vehicle subsystem is a temperature of the exhaust aftertreatment system;
receiving information indicative of an external static condition of a route of the vehicle, the external static condition including grade data for the route of the vehicle;
receiving information indicative of an external dynamic condition of the route of the vehicle, the external dynamic condition including information for the route of the vehicle that changes as a function of time;
predicting a fuel cut event based on at least one of the operating condition of the vehicle subsystem, the external static condition, or the external dynamic condition; and
modulating at least one of a torque or a speed of the engine of the vehicle in response to the operating condition of the vehicle subsystem and at least one of the external static condition or the external dynamic condition.

14. The method of claim 13, further comprising:
predicting a low temperature of the exhaust aftertreatment system based on at least one of the operating condition of the vehicle subsystem, the external static conditions, or the external dynamic conditions; and
modulating at least one of a torque or a speed of the engine to increase the temperature of the exhaust aftertreatment system.

15. The method of claim 13, further comprising:
predicting a duration of the fuel cut event based on at least one of the operating condition of the vehicle subsystem, the external static condition, or the external dynamic condition;
predicting the temperature of the exhaust aftertreatment system during the fuel cut event based on the predicted duration of the fuel cut event; and
responsive to the predicted temperature of the exhaust aftertreatment system during the fuel cut event being above a predetermined temperature threshold, modulating at least one of the torque or the speed of the engine to reduce a load on the engine during the fuel cut event.

16. The method of claim 13, further comprising:
receiving a command indicative of a target speed; and
operating the engine in a driver assist mode so that the speed of the engine is within a predetermined range of the target speed.

17. A method, comprising:
receiving information indicative of an operating condition of a vehicle subsystem of a vehicle;
receiving information indicative of an external static condition of a route of the vehicle, the external static condition including grade data for the route of the vehicle;
receiving information indicative of an external dynamic condition of the route of the vehicle, the external dynamic condition including information for the route of the vehicle that changes as a function of time;
predicting a fuel cut event based on at least one of the operating condition of the vehicle subsystem, the external static condition, or the external dynamic condition; and
modulating at least one of a torque or a speed of an engine of the vehicle in response to the operating condition of the vehicle subsystem or at least one of the external static condition and the external dynamic condition, wherein the modulating includes modulating at least one of the torque or the speed of the engine to reduce one of a number of or a duration of fuel cut events.

* * * * *